US 6,574,471 B1

(12) United States Patent
Rydbeck

(10) Patent No.: US 6,574,471 B1
(45) Date of Patent: Jun. 3, 2003

(54) APPARATUS AND METHOD FOR HANDLING INCOMING CALLS RECEIVED BY A PORTABLE INTELLIGENT COMMUNICATIONS DEVICE DURING A MEETING

(75) Inventor: Nils Rutger Carl Rydbeck, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/017,595

(22) Filed: Feb. 3, 1998

(51) Int. Cl.[7] ................................................ H04M 3/42
(52) U.S. Cl. ..................... 455/418; 455/556; 455/566; 455/567
(58) Field of Search ................................ 455/417, 418, 455/550, 556, 557, 90, 95, 344, 351; 379/373.01–373.05

(56) References Cited

U.S. PATENT DOCUMENTS

| 5,128,981 A | 7/1992 | Tsukamoto et al. |
| 5,528,667 A | 6/1996 | Steffensen et al. |
| 5,572,576 A | 11/1996 | Klausner et al. |
| 5,581,604 A | 12/1996 | Robinson et al. |
| 5,715,524 A | 2/1998 | Jambhekar et al. |
| 5,742,905 A * | 4/1998 | Pepe et al. ................... 455/461 |
| 5,903,832 A | 5/1999 | Seppanen et al. |
| 6,216,016 B1 * | 4/2001 | Cronin ......................... 455/567 |

FOREIGN PATENT DOCUMENTS

| EP | 0358301 | 3/1990 | |
| EP | 0 399 520 A2 | 11/1990 | |
| EP | 0711089 A2 | 5/1996 | |
| EP | 0783219 A2 | 7/1997 | |
| EP | 0783219 * | 7/1997 | ............ H04M/1/66 |
| WO | WO95/29568 | 11/1995 | |
| WO | WO 98/07265 | 2/1998 | |

OTHER PUBLICATIONS

Article entitled "Automatic Desktop Manipulation Based on Calendar Events" from IBM Technical Disclosure Bulletin; vol. 36, No. 08, Aug. 1993 (1 page).

* cited by examiner

Primary Examiner—Lee Nguyen
(74) Attorney, Agent, or Firm—Coats & Bennett, P.L.L.C.

(57) ABSTRACT

An apparatus and method for handling incoming calls during an operational mode for a portable intelligent communications device when a user thereof is engaged in a meeting, where the portable intelligent communications device is configured to handle each incoming call in an individual manner. When an incoming call is received while in such operational mode, a plurality of options are generated in a graphical user interface. The user of the portable intelligent communications device then activates one of the options made available for handling each incoming call.

31 Claims, 7 Drawing Sheets

APPARATUS AND METHOD FOR HANDLING INCOMING CALLS RECEIVED BY A PORTABLE INTELLIGENT COMMUNICATIONS DEVICE DURING A MEETING

BACKGROUND OF THE INVENTION

1. Field of the Invention

The present invention relates generally to a portable intelligent communications device and, more particularly, to an apparatus and method for handling incoming calls received by such portable intelligent communications device during a meeting.

2. Description of Related Art

A new class of communication devices has been developed which includes a full computer integrated with the communications hardware and software. These devices, known as portable intelligent communications devices, differ significantly from personal digital assistants (PDAs) and handheld personal computers (HPCs) in that they are designed extensively to be a communications device rather than merely a "mobile computer." As such, the top features for the communications device are telephony, enhanced telephony, messaging, and information services. In order to enable at least some of these features, the portable intelligent communications device is able to be connected to the Internet by either a wired link or a wireless link. It will also be understood that certain software applications are provided within the portable intelligent communications device to facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

It will be understood that the aforementioned portable intelligent communications device is targeted to the traveling business person. Since this type of user will constantly be engaged in meetings and other activities during which normal operation of the portable intelligent communications device would be awkward or inappropriate, it is desirable for the portable intelligent communications device to activate an operational mode consistent therewith. As disclosed in a patent application entitled "Apparatus And Method For Configuring Settings Of A Portable Intelligent Communications Device During A Meeting," having Ser. No. 08/955,913, which is also owned by the assignee of the present invention and is hereby incorporated by reference, this would involve configuring a series of settings for the portable intelligent communications device (e.g., handling and/or diverting incoming communications, disabling alarms, etc.). The '913 patent application involves the enabling and disabling of such meeting mode settings both manually and automatically, but it involves maintaining the same settings for all incoming calls while the meeting mode is employed. Since a user of the portable intelligent communications device may desire to handle some incoming calls thereto differently than others when in a meeting, and identification of the source for each incoming call is readily available, it would be desirable for an operational mode used during a meeting to offer the option of handling each incoming call in an individual manner.

Accordingly, a primary object of the present invention is to provide an apparatus and method for handling incoming calls to a portable intelligent communications device when the user thereof is engaged in a meeting or other similar activity.

It is another object of the present invention to provide an apparatus and method for handling each incoming call to a portable intelligent communications device in an individual manner when the user thereof is engaged in a meeting or other similar activity.

It is still another object of the present invention to provide an apparatus and method for handling incoming calls to a portable intelligent communications device which provides several options for each incoming call when the user is engaged in a meeting or other similar activity.

Yet another object of the present invention is to provide an apparatus and method for handling incoming calls to a portable intelligent communications device which is automatically activated when the user is engaged in a meeting or other similar activity and automatically deactivated upon completion of such meeting or activity.

Still another object of the present invention is to provide an apparatus and method for handling incoming calls to a portable intelligent communications device which is manually activated when the user is engaged in a meeting or other similar activity and manually deactivated upon completion of such meeting or other activity.

Another object of the present invention is to provide an apparatus and method for handling incoming calls to a portable intelligent communications device when the user is engaged in a meeting or other similar activity which identifies the source of each incoming call.

A further object of the present invention is to provide an apparatus and method for handling incoming calls to a portable intelligent communications device when the user is engaged in a meeting or other similar activity which alerts the user when an incoming call is received.

These objects and other features of the present invention will become more readily apparent upon reference to the following description when taken in conjunction with the following drawings.

SUMMARY OF THE INVENTION

In accordance with a first aspect of the present invention, a method for handling incoming calls during an operational mode for a portable intelligent communications device when a user thereof is engaged in a meeting is disclosed where the portable intelligent communications device is configured to handle each incoming call in an individual manner. When an incoming call is received while in such operational mode, a plurality of options are generated in a graphical user interface. The user of the portable intelligent communications device then activates one of the options made available for handling each incoming call. The method may also include the steps of identifying a source for each incoming call and alerting the user of the portable intelligent communications device when an incoming call is received.

In accordance with a second aspect of the present invention, a portable intelligent communications device is disclosed as including circuitry for performing telephony operations, a processing circuit, a display screen coupled to the processing circuit, and a graphical user interface for configuring the portable intelligent communications device to handle incoming calls during an operational mode for a meeting. A plurality of options for handling incoming calls in an individual manner is provided on the display screen when each incoming call is received, whereupon a user of the portable intelligent communications device activates one of such options.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
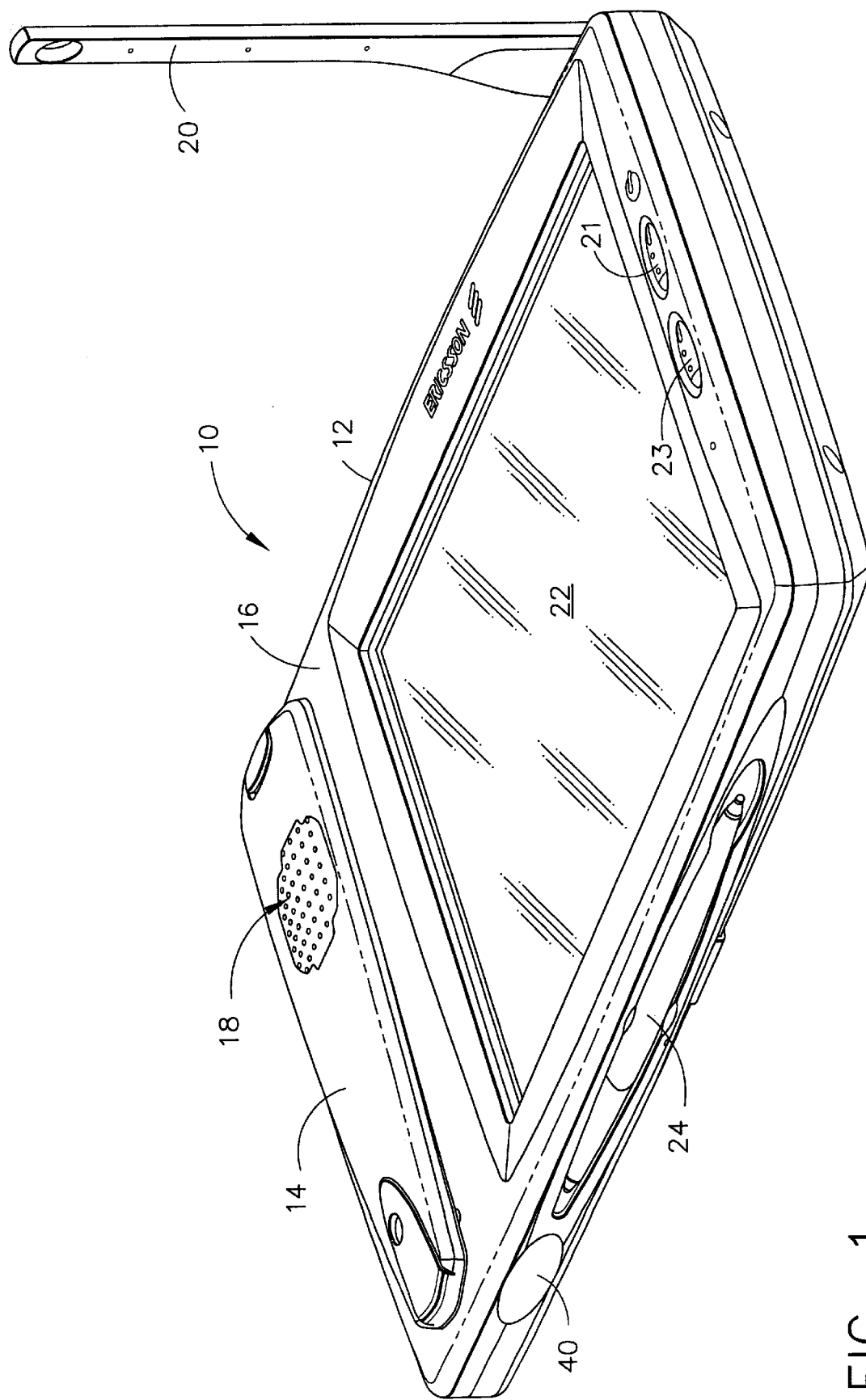
FIG. 1 is a perspective view of a portable intelligent communications device having an operational mode for meetings or other similar activities in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable communications function, as when in the cellular mode. It will be understood that various ports, jacks, and interfaces will be provided to further enable communications. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
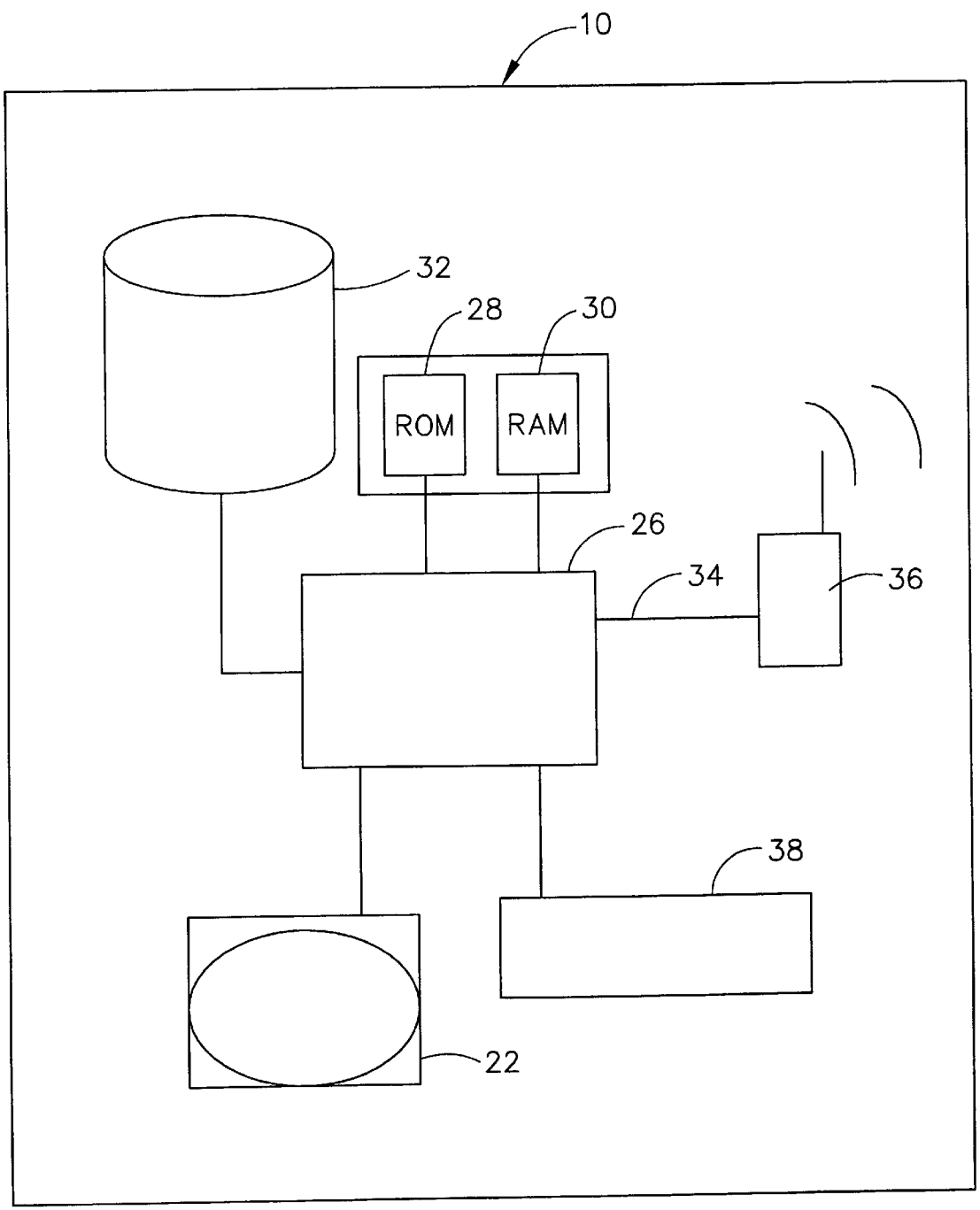
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be connected to processing circuit 26, where keyboard 38 can be depicted on display screen 22 or be a separate physical package which can be utilized with portable intelligent communications device 10 such as through a keyboard IR port 40 (see FIG. 1).

Figure 3:
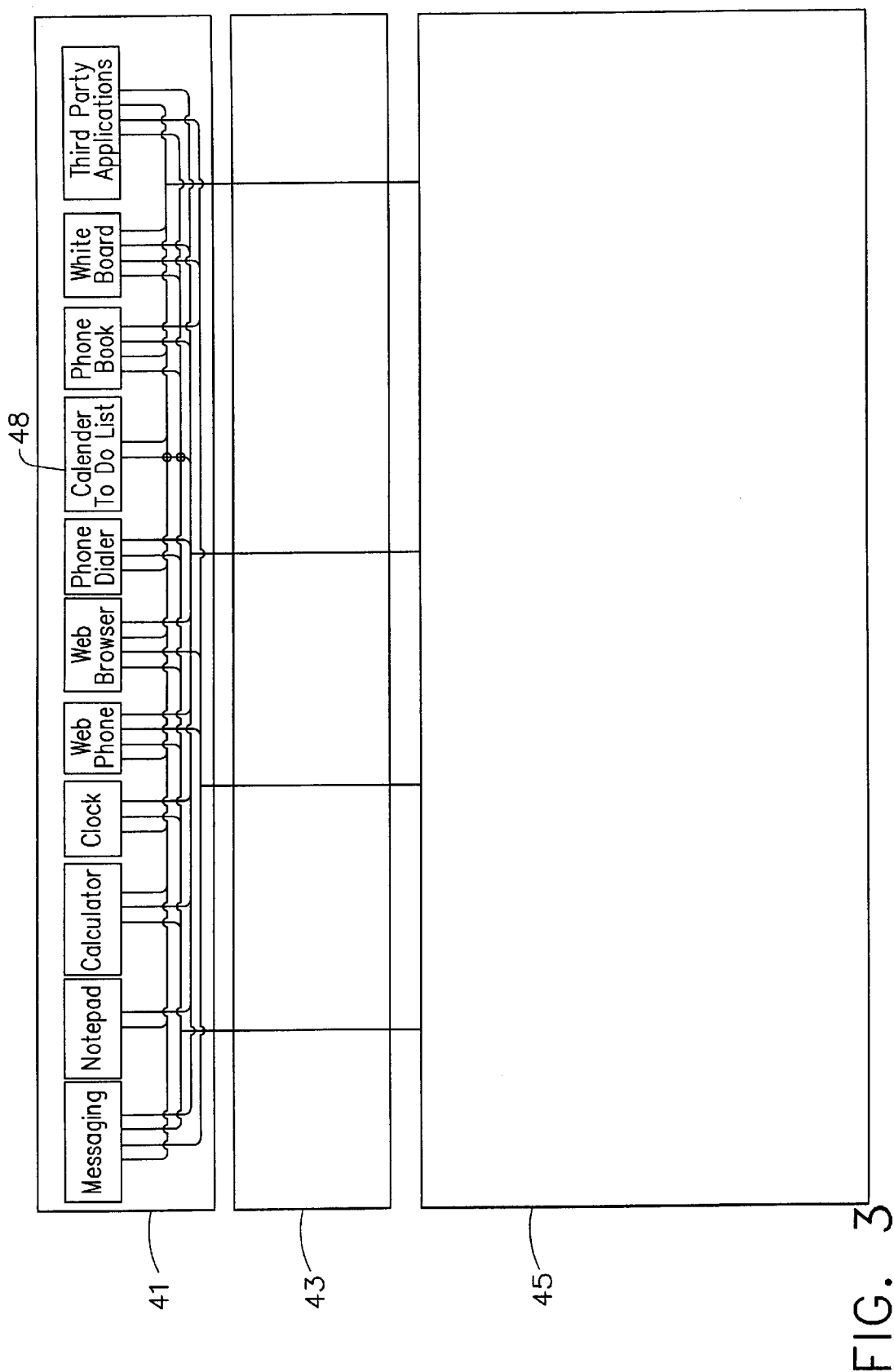
FIG. 3 is block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 42, desktop software 44, and system operating software 46 (which includes everything else from the class libraries down to the device drivers for portable intelligent communications device 10). It will be understood that neither applications software 42 nor desktop software 44 will ever interact with anything other than the top layer of system operating software 46. Exemplary software applications are shown within applications software 42, with particular reference being made to calendar/to do list software 48 in accordance with the present invention.

It will be appreciated that certain instances exist, such as during a meeting, when a user of portable intelligent communications device 10 would prefer that it be configured to operate differently than during normal conditions. In light of this preference, such an operational mode is disclosed in a patent application entitled "Apparatus And Method For Configuring Settings Of A Portable Intelligent Communications Device During A Meeting," having Ser. No. 08/955,913, which is also owned by the assignee of the present invention and is hereby incorporated by reference. This operational mode, also known as a meeting mode, involves various settings of portable intelligent communications device 10 being configured and associated with such operational mode so that they are implemented upon activation thereof (i.e., when a meeting or other similar activity is initiated). The meeting mode of operation for portable intelligent communications device 10 may be activated manually (e.g., through a graphical user interface) or automatically (e.g., through one of the software applications like calendar/to do list software application 48). The various settings of portable intelligent communications device 10 are organized under a designated file for the operational mode in a graphical user interface, as seen in FIGS. 5A–5C of the '913 patent application where separate screen displays are utilized to configure certain groups of settings. It will be understood that configuration of the settings may take place before or after manual activation of the operational mode, while configuration of these settings is preferably accomplished prior to automatic activation of such operational mode. Likewise, deactivation of such operational mode may occur either manually or automatically upon completion of the meeting or other similar activity.

Figure 4:
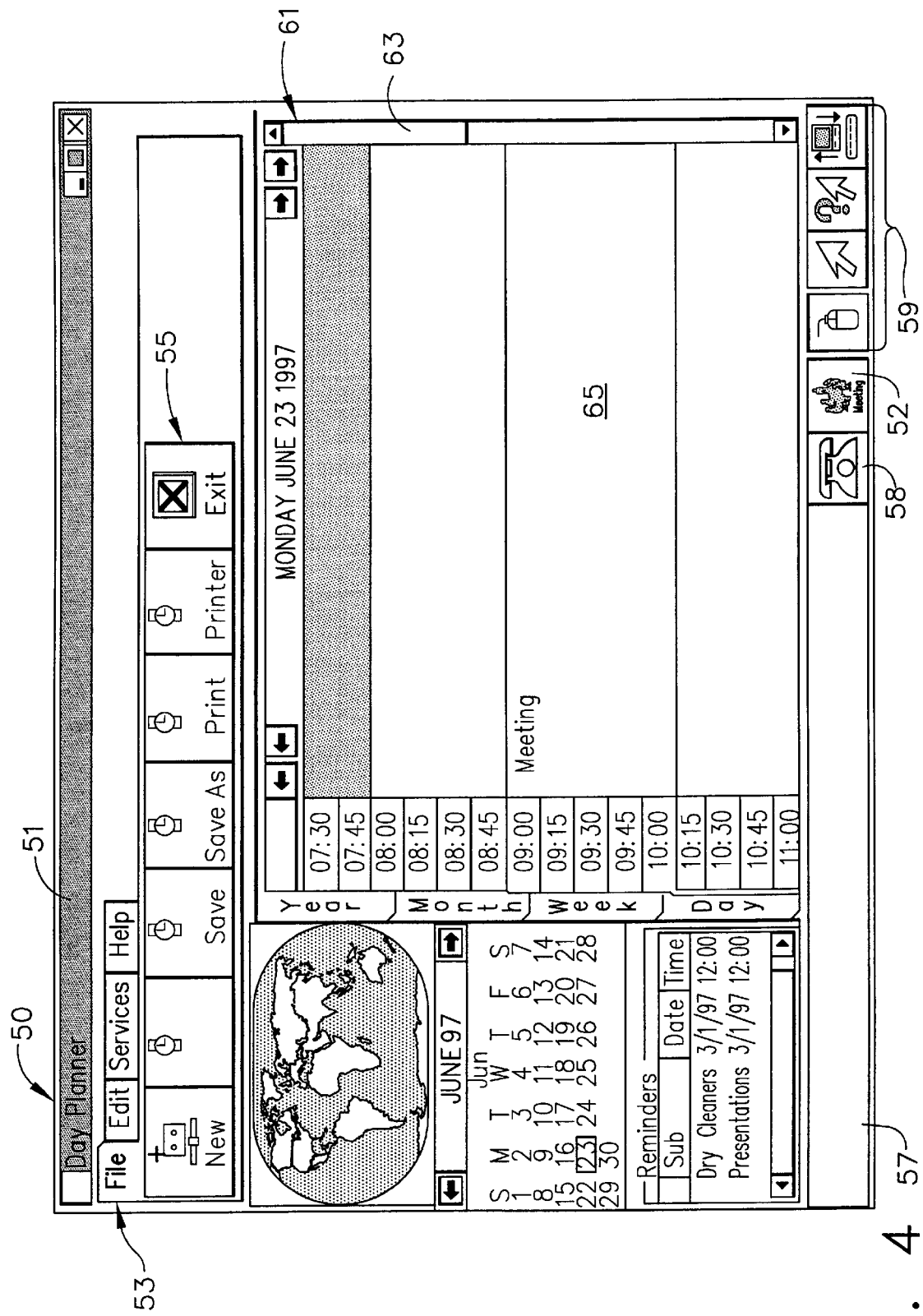
FIG. 4 is a screen display provided on the portable intelligent communications device of FIGS. 1 and 2 when operated in a calendar software application.

In order to permit better understanding of how the meeting mode can be implemented either manually or automatically, a screen display 50 for calendar/to do list software application 48 is shown in FIG. 4. It will be noted that screen display 50 includes a title bar 51 located in a top window, as well as standard control buttons located along the right-hand side of title bar 51. A main control panel 53 is shown as including a plurality of tabbed areas, from which a second level of menu choices control buttons (identified collectively by the numeral 55), appear after selection of one of the tabs in main control panel 53. A bottom rectangular area 57 of screen display 50 is preferably used to display status information and may include one or more mouse-mode control buttons 59.

Figure 7:
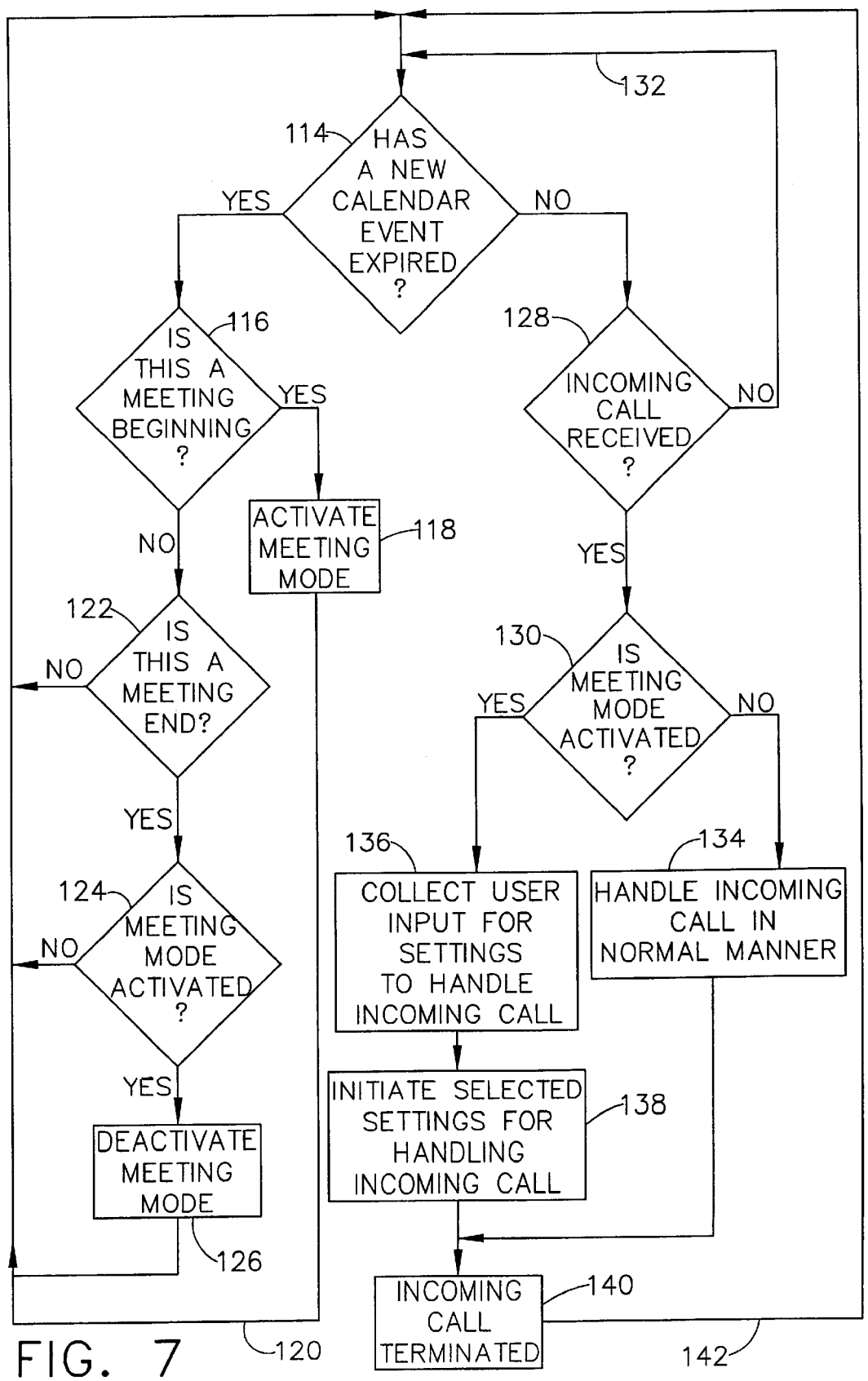
FIG. 7 is a flow diagram of the process steps taken when an incoming call is received by the portable intelligent communications device when in the meeting mode of operation.

It will further be noted that one of mouse-mode control buttons 59 is a meeting mode control button 52, which is seen best in FIG. 7 of the '913 application. With respect to manual activation and deactivation of the meeting operational mode, control button 52 is pressed. Activation of control button 52 not only causes such control button to appear highlighted (or depressed), but a message also preferably appears within status bar 57 indicating that the meeting mode has been activated. Otherwise, control button 52 appears normally and no message is presented in status bar 57. It will be understood that control button 52 and the implementation of the meeting mode can be provided within a screen display for any of the software applications, as can the use of the status bar for presenting a corresponding message. This may be accomplished via a control drag and drop interface, for example, as shown and described in a patent application entitled "System To Associate Controls With Applications Using Drag And Drop Interface," Ser. No. 08/955,518 which is also owned by the assignee of the present invention and is hereby incorporated by reference.

With regard to automatic activation and deactivation of the operational mode, one example for accomplishing this task is to base it on appointments made in calendar/to do list software application 48 of portable intelligent communications device 10. As further seen in FIG. 4, appointments and/or meetings may be scheduled within a work area 61 of screen display 50 (having a vertical scroll bar 63), preferably for a designated time range (as denoted by a highlighted area 65 in work area 61). Of course, certain desirable information identifying a meeting or appointment may be included within highlighted area 65. Accordingly, the operational mode is activated upon initiation of such an appointment and then automatically deactivated upon conclusion thereof.

Figure 5:
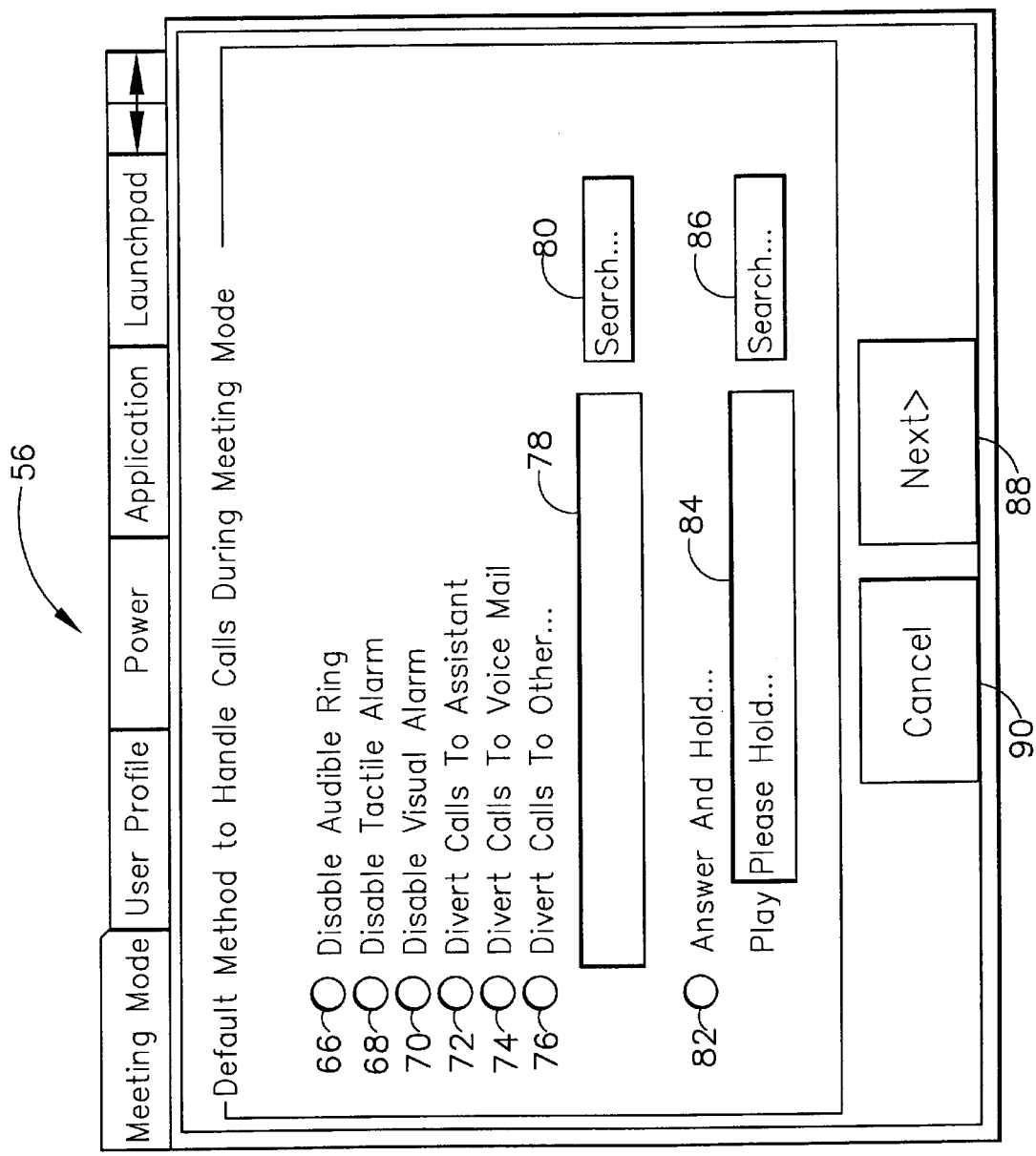
FIG. 5 is a screen display provided by a graphical user interface which is used to configure certain default settings of the portable intelligent communications device in accordance with an operational mode utilized when a user thereof is engaged in a meeting or other similar activity.

Previously, the '913 patent application provided for handling all incoming calls in the same manner since the settings for the meeting mode of operation were chosen prior to receiving an incoming call. It has been learned, however, that this is somewhat limiting to a user of portable intelligent communications device 10 which desires to handle incoming calls in an individual manner depending upon the source of such incoming call. Accordingly, FIG. 5 is similar to the screen display depicted in FIG. 5A of the '913 patent application, but a screen display 56 therein is generated for providing certain default settings related to the handling of calls and other inbound communications to portable intelligent communications device 10 during the meeting mode of operation. Screen display 56 also includes the disabling of certain alarms as well. It will be understood that the default settings are configured, so that when chosen, each incoming call will be handled the same according to such default settings.

More specifically, a bubble 66 is provided so that an audible ring alarm may be disabled to further prevent interruption during the meeting or appointment. An additional option is to deactivate a tactile alarm and/or a visual alarm through bubbles 68 and 70, respectively, so that the user is not distracted in a non-audible manner when an incoming call is received by portable intelligent communications device 10. It will be appreciated that one or more of the available alarms may be deactivated via bubbles 66, 68 and 70 in the default setting.

Further, screen display 56 includes several default setting options for the handling of incoming calls to portable intelligent communications device 10. These options include diverting calls to an assistant (bubble 72), diverting calls to voice mail (bubble 74), and diverting calls to some other location (bubble 76) designated in a box 78 or through a search button 80. Another option is to answer the call and place the caller on hold (bubble 82) so that a message shown in box 84 may be played. A search button 86 is preferably provided so that the user of portable intelligent communications device 10 has several messages from which to choose, such as the callee will be available momentarily.

It will be appreciated that screen display 56 may be the first in a series of display screens for configuring various default settings associated with the operational mode. Accordingly, separate control buttons 88 and 90, respectively, may be provided along a bottom area of display screen 56 in order to manipulate forward to another screen display or to cancel the default configuration of the meeting mode. In this way, additional default settings for the operational mode may be configured (see FIGS. 5B and 5C in the '913 patent application, for example, where settings related to the work area and power for portable intelligent communications device 10 are provided).

Figure 6:
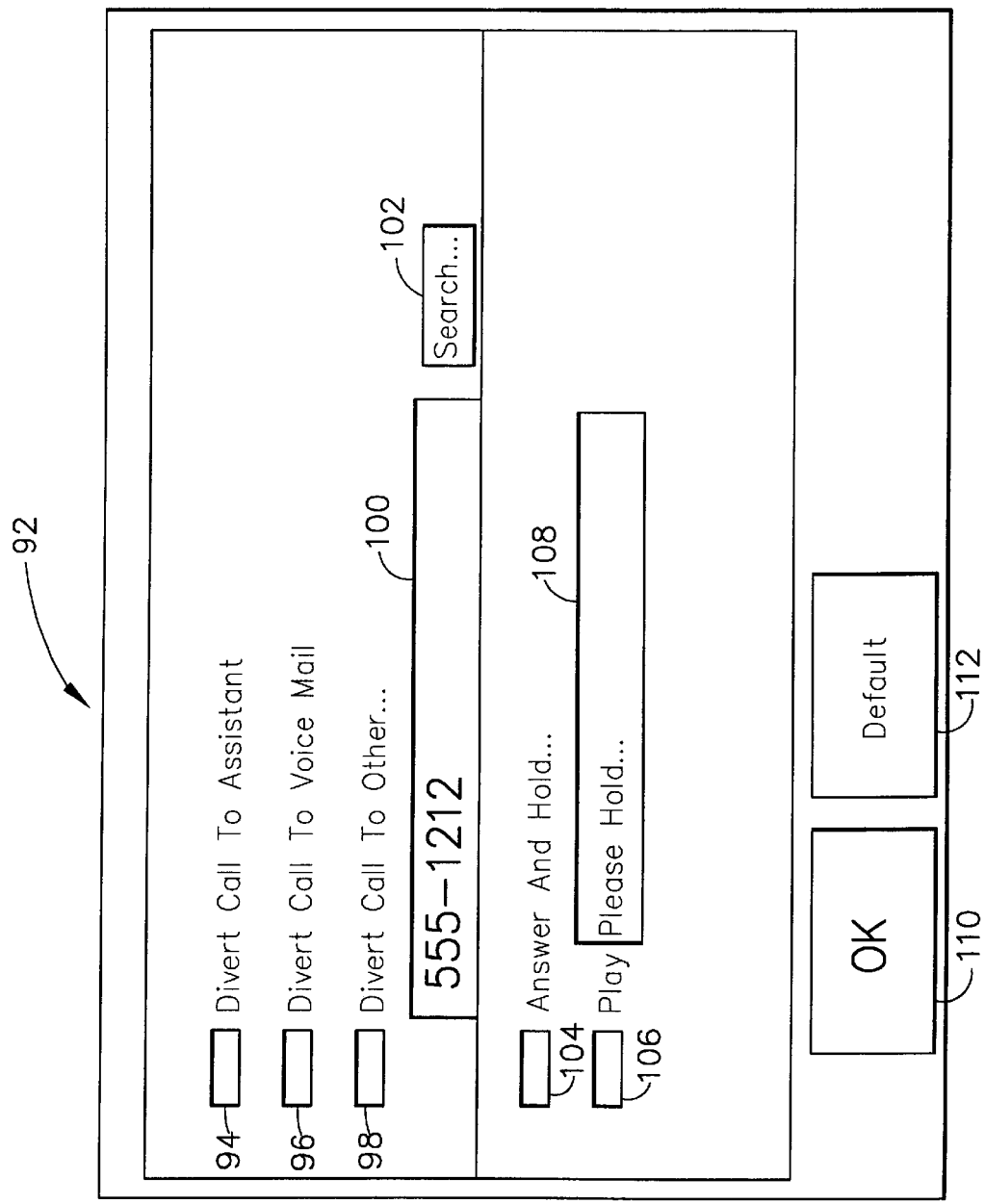
FIG. 6 is a screen display provided by a graphical user interface when each incoming call is received which provides several options for handling such incoming call to the portable intelligent communications device when a user thereof is engaged in a meeting or other similar activity.

In accordance with the present invention, a screen display 92 is generated (see FIG. 6) upon receipt of each incoming call by portable intelligent communications device 10. In this way each incoming call may be handled in an individual manner by diverting it to one of several alternative locations by means of filling bubble 94 (to an assistant), bubble 96 (voice mail), or bubble 98 (to some other location designated in box 100 or through a search button 102). Another alternative is to fill bubble 104, where the call is answered and the caller put on hold so that he may hear a message (bubble 106) shown in box 108. This latter option enables a user of portable intelligent communications device 10 to excuse himself from the meeting and take the call within a designated time period. It will be understood that the process for selecting an appropriate option for a particular incoming call is preferably enhanced through the use of a caller ID function implemented in communications circuitry 36, whereby the source of an incoming call is determined and displayed on display screen 22. Screen display 92 will also preferably have control buttons 110 and 112, respectively, for verifying the selected settings for the particular incoming call or implementing the default settings previously chosen in screen display 56.

Of course, some indication may be given on display screen 22 of portable intelligent communications device 10 of the status for the operational mode described herein (e.g., in status bar 57 of screen display 50 as described above). As discussed herein, activation of the operational mode may be accomplished easily through graphical user interfaces and automatically through other software applications. When done automatically, one advantage is that the operational mode will automatically be deactivated upon completion of the appointment or meeting so that subsequent inbound communications will not be diverted or lost. It is also preferred that some indication be provided on display screen 22 when an incoming call has been received by portable intelligent communications device 10. This can be accomplished, for example, graphically through an indicator 114 located adjacent control buttons 59 in screen display 50 and/or textually in bottom rectangular area 57 thereof (see FIG. 4).

In order to better disclose how handling of incoming calls is accomplished during the operational mode for meetings or other similar activities, FIG. 7 is a flow chart illustrating the steps undertaken depending upon whether a new calendar event or an incoming call takes place first. It will be seen, however, that the process is concerned in each instance with handling of an incoming call received by portable intelligent communications device 10 when in the meeting mode of operation.

As seen in FIG. 7, the logic first determines whether a new calendar event has expired (decision box 114). This step contemplates that the operational mode could have been activated automatically, such as through use of calendar/to do list software application 48 described hereinabove. If the answer is yes, the logic then determines whether the event is a meeting beginning (decision box 116). When answered positively, the meeting mode of operation is then activated (box 118). Accordingly, the process returns to decision box 114 via a feedback loop 120. It will be understood that if the new calendar event which has expired is not a meeting beginning (i.e., the determination of decision box 116 is negative), the logic then decides whether the calendar event is a meeting end (decision box 122). If the answer is no, the logic returns to decision box 114 via feedback loop 120. If the answer is yes, the logic determines whether the meeting mode has been activated (decision box 124). If the meeting mode was activated, it is first deactivated (box 126) and then the logic returns to decision box 114 via feedback loop 120. If the meeting mode was not activated, it remains inactivated and also returns to decision box 114 via feedback loop 120.

In the case where a new calendar event has not expired (i.e., a negative answer to the inquiry of decision box 114), the logic determines whether an incoming call has been received by portable intelligent communications device 10 (decision box 128). If the inquiry of decision box 128 is answered in the negative, the logic returns to decision box 114 via a feedback loop 132. If answered in the affirmative, it is then determined whether the meeting mode has been activated (decision box 130). This inquiry is necessary since the meeting mode may have been activated manually.

With respect to the inquiry of decision box 130, the incoming call will be handled in the usual manner when the meeting mode has not been activated (box 134). When the meeting mode has been activated, however, user input is collected as to the desired settings for handling such incoming call (box 136) and then such settings are initiated (box 138). After the incoming call is terminated (box 140), whether handled under the meeting mode or not, the process returns to the initial step at decision box 114 via a feedback loop 142. It will be appreciated, then, that this process will continue, with the appropriate actions being taken depending upon the answer to the inquiries of decision boxes 114 and 128.

Having shown and described the preferred embodiment of the present invention with particular reference to the drawings, further adaptations of the apparatus and method for handling incoming calls received by a portable intelligent communications device during a meeting or other similar activity can be accomplished by appropriate modifications by one of ordinary skill in the art without departing from the scope of the invention.

What is claimed is:

1. A method of handling incoming calls during an operational mode for a portable intelligent communications device when a user of said portable intelligent communications device is engaged in a meeting, said method comprising:

configuring said portable intelligent communications device for handling each incoming call in an individual manner when said operational mode is activated;

setting a meeting appointment in a calendar software application of said portable intelligent communications device for a designated date and time range;

automatically activating said operational mode in response to initiation of said meeting appointment;

generating a plurality of options available to the user of said portable intelligent communications device when an incoming call is received while said operational mode is active, said plurality including the option of answering said incoming call;

displaying said plurality of options via a graphical user interface on a display screen of said portable intelligent communications device; and activating one of said incoming call handling options.

2. The method of claim 1, further comprising the step of identifying a source for each incoming call.

3. The method of claim 1, further comprising the step of alerting the user of said portable intelligent communications device when an incoming call is received.

4. The method of claim 1, wherein one of said options for handling an incoming call is diverting said incoming call to voice mail.

5. The method of claim 1, wherein one of said options for handling an incoming call is diverting said incoming call to an assistant.

6. The method of claim 1, wherein one of said options for handling an incoming call is diverting said incoming call to another phone number.

7. The method of claim 6, said option having a plurality of stored phone numbers from which to designate.

8. The method of claim 1, one of said options also including placing the incoming call on hold for a predetermined time period.

9. The method of claim 1, said one of options also including playing a prerecorded message.

10. The method of claim 9, said option having a plurality of stored messages from which to choose.

11. The method of claim 1, wherein said operational mode is activated manually.

12. The method of claim 1, further comprising the step of selecting certain default settings for handling an incoming call to said portable intelligent communications device.

13. The method of claim 12, wherein one of said options for handling an incoming call is activating said default settings.

14. The method of claim 1 further comprising automatically terminating said operational mode in response to the expiration of said meeting appointments.

15. The method of claim 1 wherein said automatically activating said operational mode in response to initiation of said meeting appointment comprises automatically activating said operational mode solely in response to initiation of said meeting appointment.

16. A portable intelligent communications device, comprising:

circuitry for performing telephony operations;

a processing circuit;

a real-time clock circuit;

software running on said processor operative to compare previously entered meeting appointments designating a date and time range to said real-time clock circuit, and to automatically initiate an operational mode when a user of said portable intelligent communications device is engaged in a meeting;

a display screen coupled to said processing circuit; and a graphical user interface for configuring said portable intelligent communications device to handle incoming calls in an individual manner when said operational mode is active, wherein a plurality of options for handling each incoming call is provided on said display screen via said graphical user interface when an incoming call is received.

17. The portable intelligent communications device of claim 16, wherein said telephony circuitry and said processing circuit are able to identify a source for each incoming call.

18. The portable intelligent communications device of claim 16, further comprising a mechanism for alerting a user when an incoming call is received.

19. The portable intelligent communications device of claim 16, wherein said operational mode is activated manually through a graphical user interface.

20. The portable intelligent communications device of claim 16, wherein one of said options for handling an incoming call is diverting said incoming call to voice mail.

21. The portable intelligent communications device of claim 16, wherein one of said options for handling an incoming call is diverting said incoming call to an assistant.

22. The portable intelligent communications device of claim 16, wherein one of said options for handling an incoming call is forwarding said incoming call to another phone number.

23. The portable intelligent communications device of claim 22, said option having a plurality of stored phone numbers from which to designate.

24. The portable intelligent communications device of claim 16, wherein one of said options for handling an incoming call is answering said incoming call.

25. The portable intelligent communications device of claim 24, said option also including placing the incoming call on hold for a predetermined time period.

26. The portable intelligent communications device of claim 24, said option also including playing a prerecorded message.

27. The portable intelligent communications device of claim 26, said option having a plurality of stored messages from which to choose.

28. The portable intelligent communications device of claim 16, further comprising a graphical user interface for configuring certain default settings for handling incoming calls to said portable intelligent communications device.

29. The portable intelligent communications device of claim 28, wherein one of said options for handling an incoming call is selecting said default settings.

30. The portable intelligent communications device of claim 16 wherein said software is further operative to automatically terminate said operational mode in response to the expiration of said meeting appointment.

31. The portable intelligent communications device of claim 16, wherein said software determines that a user of said portable intelligent communications device is engaged in a meeting based solely on said comparison.

* * * * *